Patented Nov. 5, 1929

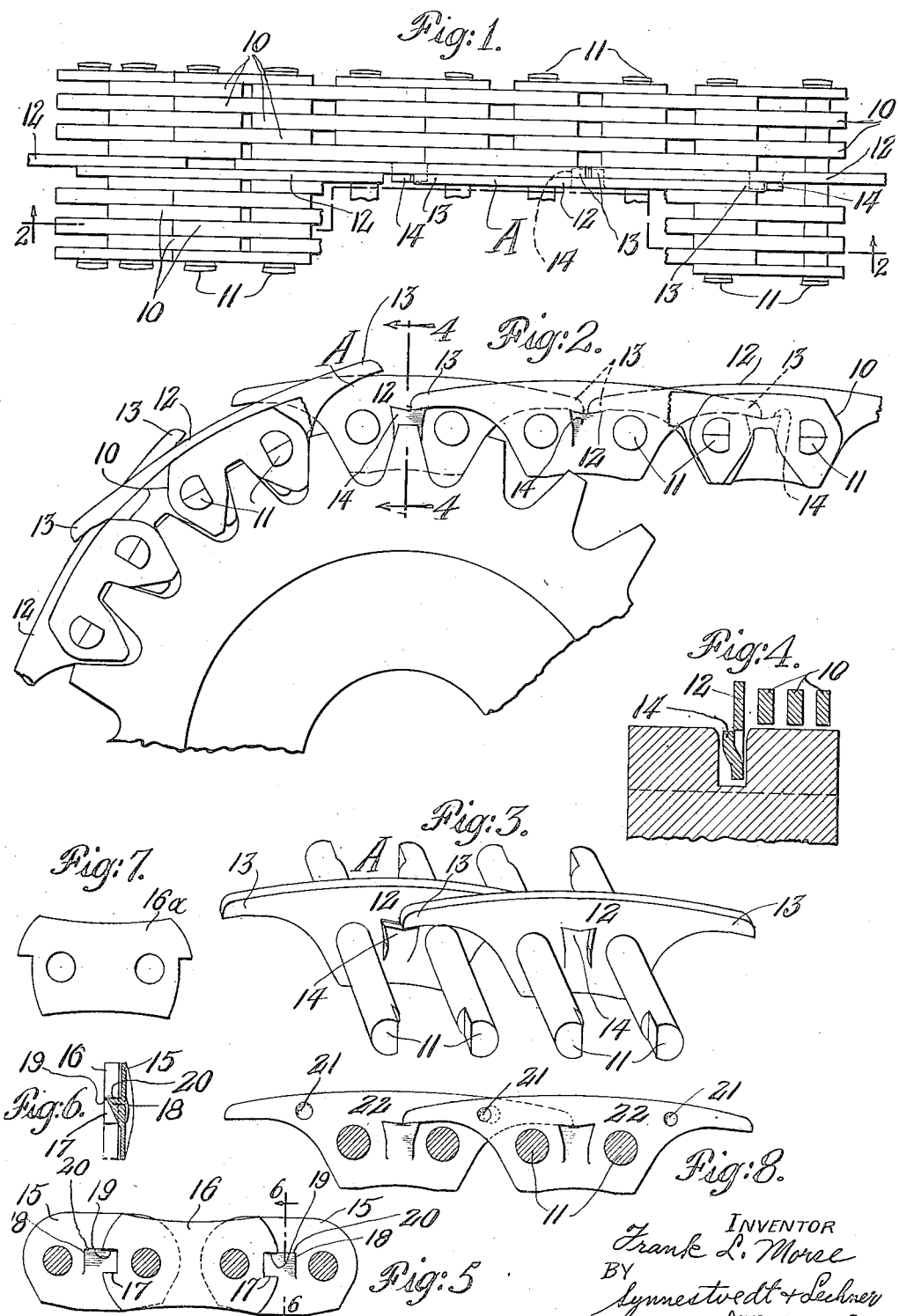

1,734,688

UNITED STATES PATENT OFFICE

FRANK L. MORSE, OF ITHACA, NEW YORK, ASSIGNOR TO MORSE CHAIN COMPANY, OF ITHACA, NEW YORK, A CORPORATION OF NEW YORK

MULTIPLE-DRIVE CHAIN

Application filed June 22, 1926. Serial No. 117,683.

This invention relates to drive chains and more particularly to those in which the links are formed of a plurality of plates.

One of the primary objects of the invention is to provide a chain of novel, simple, and inexpensive construction in which back bend of the chain is prevented.

Another object is to provide a chain of the characteristics described in which the parts are so disposed that inaccuracies in manufacture become a negligible factor, in consequence of which it is easy to manufacture a chain which, in the first instance, can be readily assembled and which will continue satisfactorily in operation even over extended periods of service.

A further object of the invention is to provide a chain in which whipping of the chain is prevented.

How the foregoing, together with such other objects and advantages as may hereinafter appear, or are incident to my invention, are realized, is illustrated in preferred form in the accompanying drawings, wherein—

Fig. 1 is a fragmentary plan view of a portion of a drive chain embodying my improvements.

Fig. 2 is a vertical section taken on line 2—2 of Fig. 1 and showing the chain passing over a sprocket wheel.

Fig. 3 is a perspective view of a detail of my invention.

Fig. 4 is a section taken on the line 4—4 of Fig. 2.

Fig. 5 shows a modification of the invention.

Fig. 6 is a cross section taken on the line 6—6 of Fig. 5, and

Figs. 7 and 8 show still other modifications of the invention.

Referring now more particularly to Figs. 1 to 4, inclusive, it will be seen that the links of the chain are composed of a plurality of plates 10 arranged in interspersed relation on the pintles 11. The link plates 10 are of the usual arch-shaped form which adapts them to extend over the teeth of a sprocket wheel.

In Fig. 1 I have shown these plates arranged in two groups spaced apart with plates of special construction arranged in the space between said groups and constituting a device indicated by the reference letter A, for preventing back bend of the chain and also for preventing whipping thereof, as will further appear.

The device A comprises a plurality of link plates 12 arranged in lapped relation on the pintles 11 so that a strand of chain is provided which is composed of a double row of the link plates 12, which strand may be continuous throughout the length of the chain, or may be interrupted as will further appear. In the embodiment shown in Figs. 1, 2 and 3, it will be seen that the plates 12 are provided with longitudinally extending overhanging, or wing portions 13 and lateral projections 14, and that these plates are so disposed on the pintles 11 as will cause the portions 13 of one plate to strike the projections 14 of its adjacent plates when the chain tends to bend back. It is to be noted that the point at which this striking occurs is substantially in line with the pintle joints so that a change of pitch in the chain will not materially affect the operation of the device. It may be desirable, however, to further insure against this, to which end I have shown the contacting surfaces somewhat inclined to compensate for such changes in pitch. In this connection, it will be seen that as the pitch lengthens and the portions 13 of the plates 12 ride up the incline of the projections 14, the disposition of the contact point will cause the chain to be substantially straight.

From the foregoing it will be seen that the links are positively held against backbend, and that the links are free to bend around the sprocket wheels. By so preventing back-bend of the chain, the chain cannot whip, since to whip it must bend to both sides of the tangential line between the sprockets. As it cannot do this the rhythm is destroyed, and, consequently, whipping prevented.

It is obvious that the wings do not necessarily have to bear on projections such as the projections or abutments 14. Thus, for example, as will readily be perceived upon inspection of Fig. 3, the wings on one of the plates 12 may be made to advantage of a shape to bear upon the pintles carrying adjacent plates. I prefer using the abutments 14, as it is simple to manufacture the plates with these abutments having the proper inclination of bearing surface to compensate for changes in pitch.

It will also be seen that the wings are of considerable length and bear at their ends only, which means that inaccuracies in manufacture are of no material consequence, the distance from the point of flexing being so great that the effect of ordinary manufacturing inaccuracies is reduced to a negligible factor, whereby the chain is made an ordinary manufacturing possibility. By the same token the effect of wear is negligible, in consequence of which the chain will run for a great length of time without whipping or noise.

While I have shown in the drawings a continuous strand of anti-whipping or anti-back bend plates, it will be apparent that advantageous results may be obtained, although perhaps with less degree, by using a few anti-whipping plates in groups here and there throughout the length of the chain. In such construction any whipping action would be broken up, that is to say, it could tend to occur only locally, the tendency to general whipping being resisted by the groups. Thus the rhythm or rhythmic movement which produces whipping cannot occur.

As will be seen on inspection of the drawings, I have combined the usual guide links or plates with the anti-whipping elements.

I am aware that it has heretofore been contemplated to provide anti-back bend chains, but, for the most part, the construction of the same has been such that noise as well as whip rapidly develops. Furthermore, it has been necessary to use a strand composed of a plurality of plates in width, whereas I am enabled, by my construction, to employ a strand of but two plates in width.

Referring now to the modification shown in Figs. 5 and 6, I have therein shown the anti-back bend device as composed of alternate rigid and spring link plates 15 and 16. The rigid plates 16 are provided with slots 17 in their end portions which engage the projections 18 on the spring plates 15. Back bend is prevented by virtue of the surface 19 of the slots 17 striking the surface 20 of the projections 18. The lateral spring tension between the plates to a certain extent holds the links in the slack run of chain in a fixed relation to one another, whereby the forces tending to cause whipping are resisted. However, should the whipping influences overcome this spring tension, the positive engagement of the slots 17 and projection 18 would prevent whipping. In Fig. 7 a rigid link plate 16ª is shown in which the lower portion of the slot is cut away.

Fig. 8 shows another modification in which snap means 21 are employed in association with link plates 22 of the type shown in Figs. 1 to 3, inclusive, for the same general purpose as described in connection with Fig. 5. In this instance, the wing portion of the plates would preferably be made so as to have a lateral spring action.

I claim:—

1. A multiplate drive chain having pintles and links comprising a plurality of plates interspersed upon the pintles with the plates of adjacent links, and means for preventing back bend of the chain including link plates having laterally projecting portions and longitudinal extensions, said longitudinal extensions extending over pintles adjacent the pintles on which said plates are carried, and said plates being arranged in lapped relation on the pintles whereby the extensions of one set of plates engage the projections of the other set when the chain tends to bend back.

2. In a multiplate drive chain, the combination of a plurality of pintles and links, and anti-back bend plates interspersed upon pintles with the links, said plates having wing-like means extending over pintles adjacent the pintles on which said plates are carried adapted to abut against an adjacent part when back-bend tends to occur.

3. An anti-back-bend plate for multiplate drive chains comprising a link-like body portion adapted to be carried on the chain pintle and having a wing-like extension, and an offset abutment portion near its middle region.

4. A multiplate drive chain having pintles and links comprising a plurality of plates interspersed upon the pintles with plates of adjacent links, and a plurality of groups of other plates, the plates of each group having means whereby the plates are adapted to cooperate to prevent back bend of the chain.

5. In a multiplate chain, the combination of a plurality of pintles and links and anti-back bend plates interspersed upon pintles with the links, said plates having lateral projections and longitudinal extensions adapted to abut when back-bend tends to occur, said lateral projections presenting inclined surfaces to the longitudinal extensions whereby change in operative relation of the projections to the extensions caused by increase in pitch of the chain is compensated for.

6. The combination with a multiple drive chain, of anti-back bend means and means associated with said means for automatically compensating for change in operative relation of the parts of the anti-back bend means caused by increase in pitch of the chain.

7. A multiplate drive chain having pintles and links comprising a plurality of plates interspersed upon the pintles with plates of adjacent links and a strand of guide plates provided with anti-back bend means, said strand being carried by the pintles.

8. In a multiplate chain, the combination of a plurality of pintles and links, and anti-back bend plates interspersed upon pintles with the links, said plates having wing-like means adapted to abut against an adjacent part when back-bend tends to occur and said plates having means for exerting lateral pressure on the links.

9. In a multiplate chain, the combination of a plurality of pintles and links, and anti-back bend plates interspersed upon pintles with the links, said plates having means adapted to abut when back bend tends to occur and said plates having means for exerting lateral pressure on the links.

10. A multiplate drive chain having pintles and links comprising a plurality of plates interspersed upon the pintles with the plates of adjacent links, and other plates carried by the pintles, said other plates having means for exerting lateral pressure upon the link plates and for preventing back bend of the chain.

In testimony whereof, I have hereunto signed my name.

FRANK L. MORSE.